June 26, 1934.  H L. TANNER  1,964,231
CONTROL SYSTEM AND APPARATUS
Filed Nov. 28, 1930    9 Sheets-Sheet 1
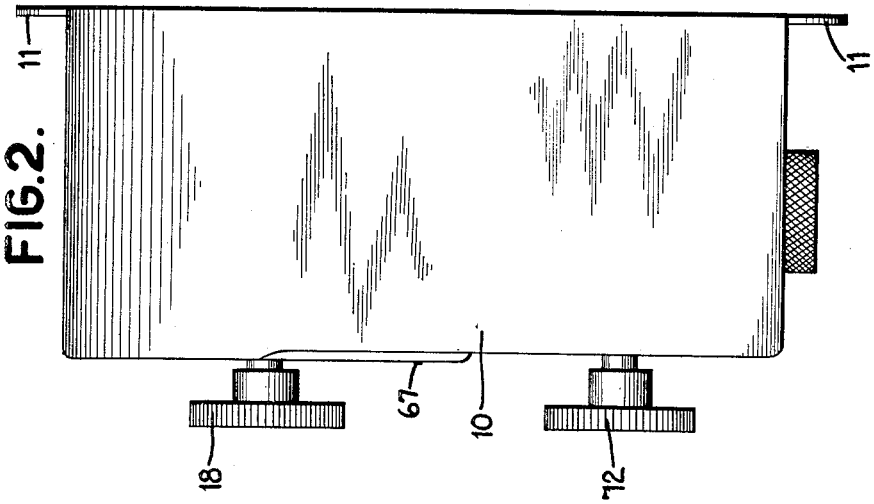
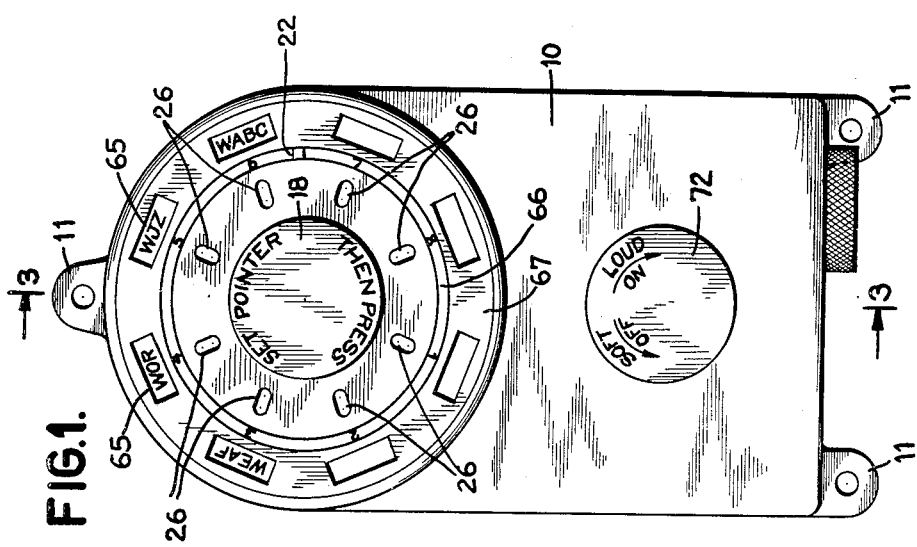
Inventor
Harry L. Tanner, dec'd.,
by The National City Bank of
New York,
By its Attorneys   Executor.
Cooper, Kerr + Dunham

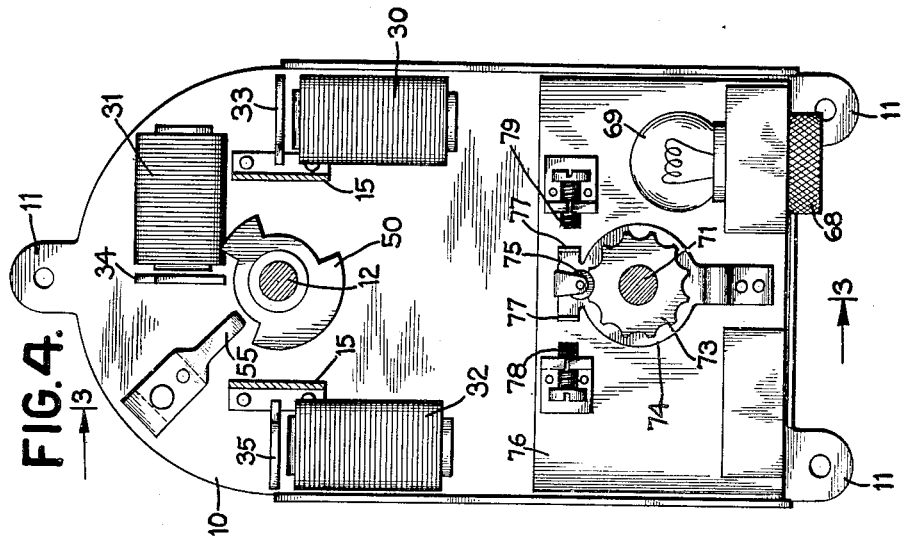

June 26, 1934.   H. L. TANNER   1,964,231
CONTROL SYSTEM AND APPARATUS
Filed Nov. 28, 1930   9 Sheets-Sheet 3
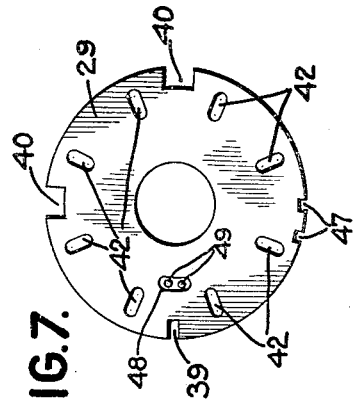
FIG.7.
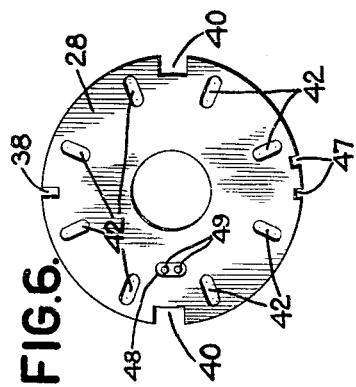
FIG.6.
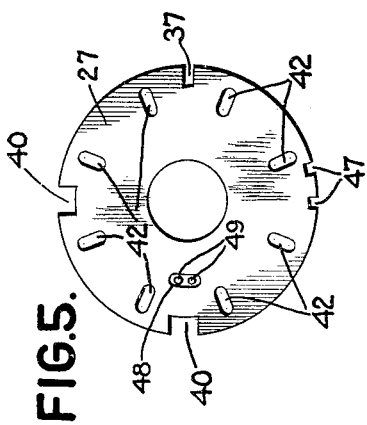
FIG.5.
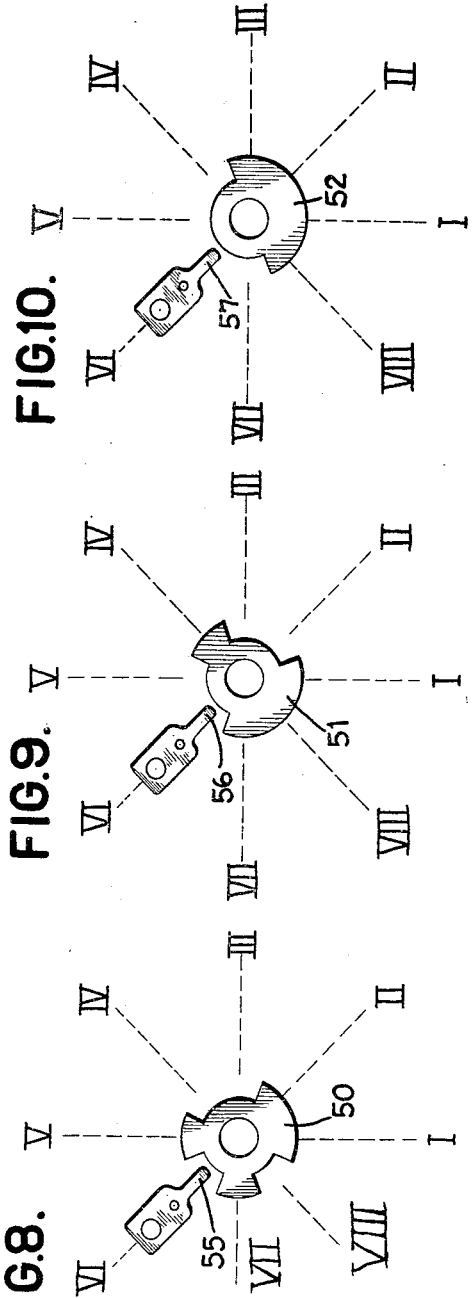
FIG.10.
FIG.9.
FIG.8.
Inventor
Harry L. Tanner, dec'd,
by The National City Bank of
New York, Executor.
By its Attorneys
Cooper, Kerr & Dunham

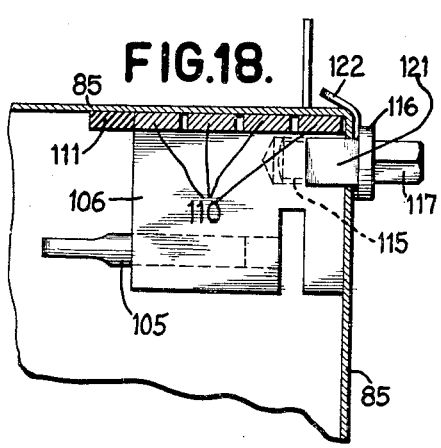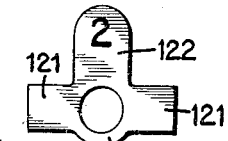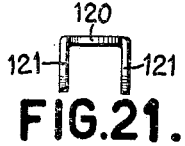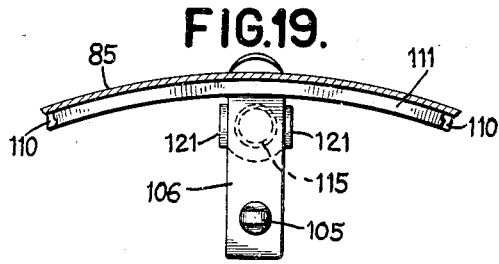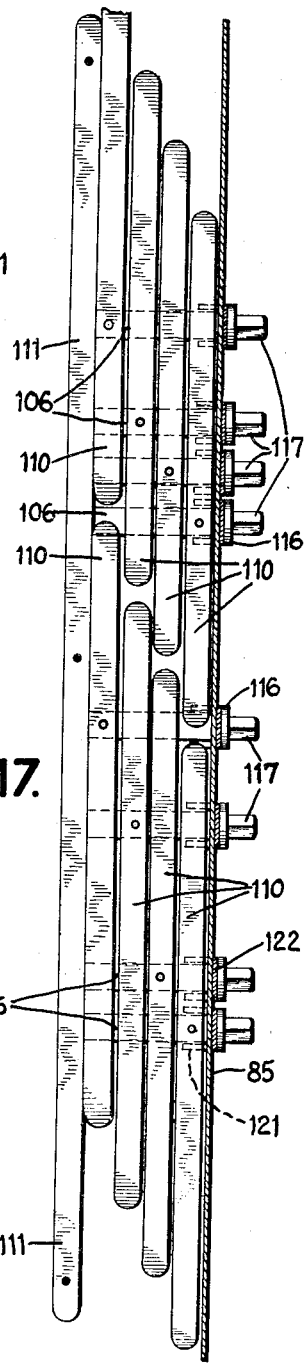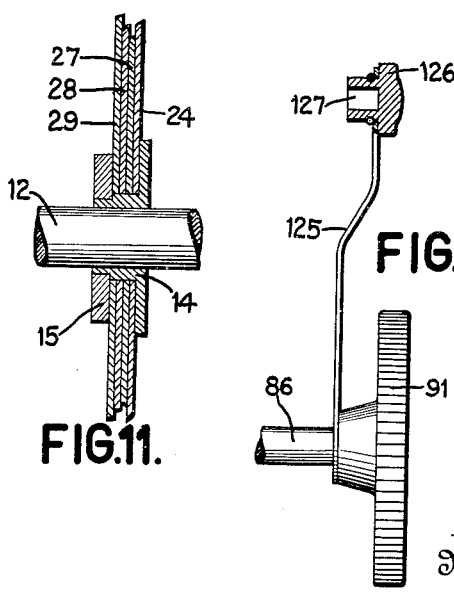

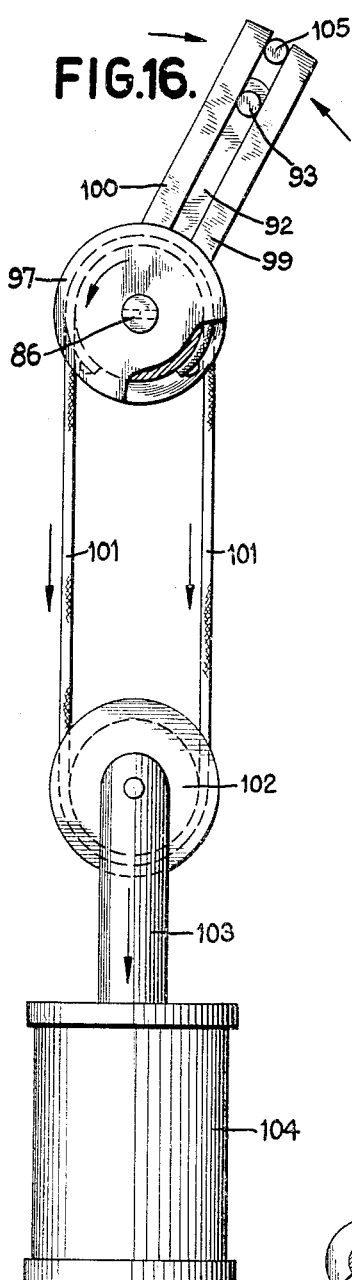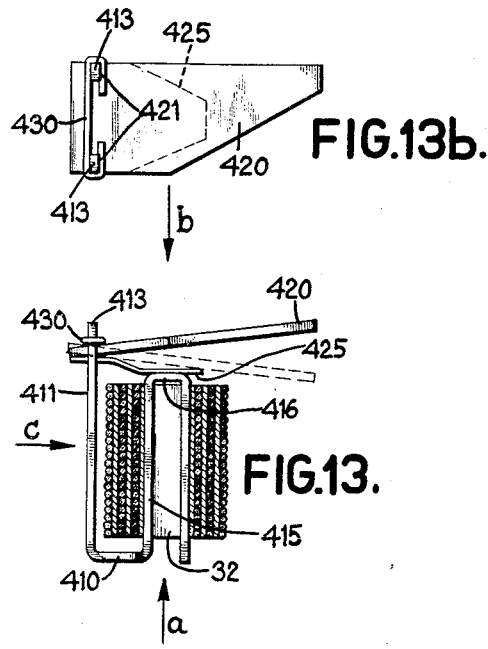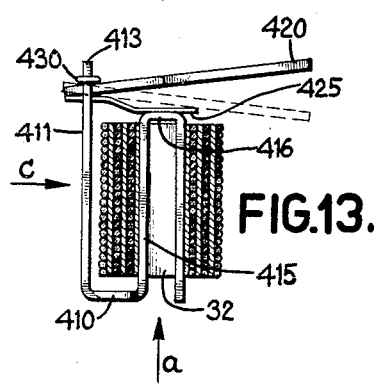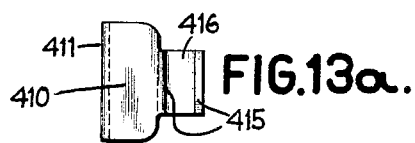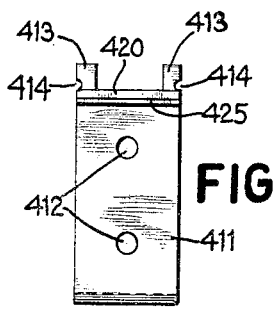

June 26, 1934.  H. L. TANNER  1,964,231
CONTROL SYSTEM AND APPARATUS
Filed Nov. 28, 1930  9 Sheets-Sheet 6
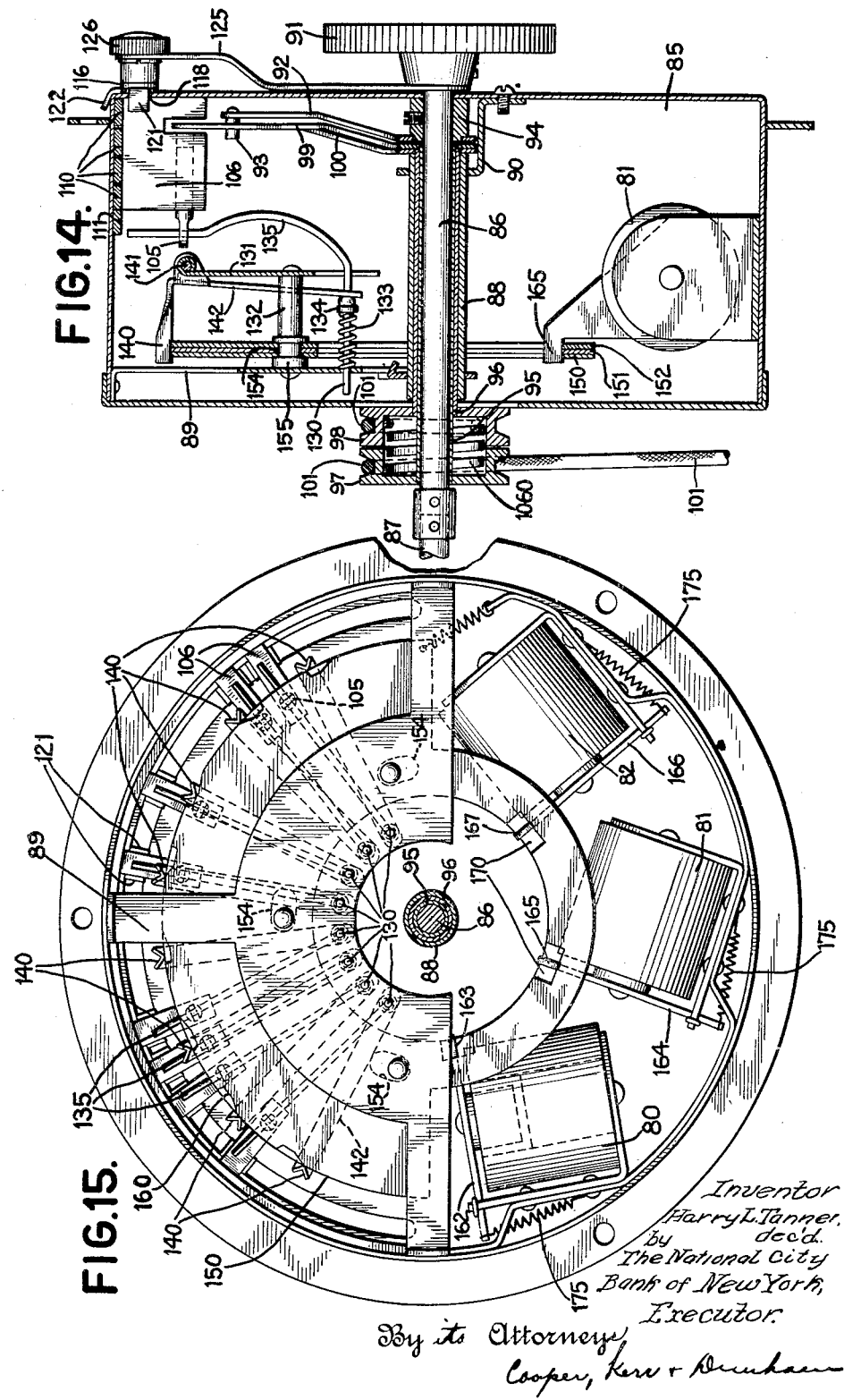

June 26, 1934.  H. L. TANNER  1,964,231
CONTROL SYSTEM AND APPARATUS
Filed Nov. 28, 1930  9 Sheets-Sheet 7
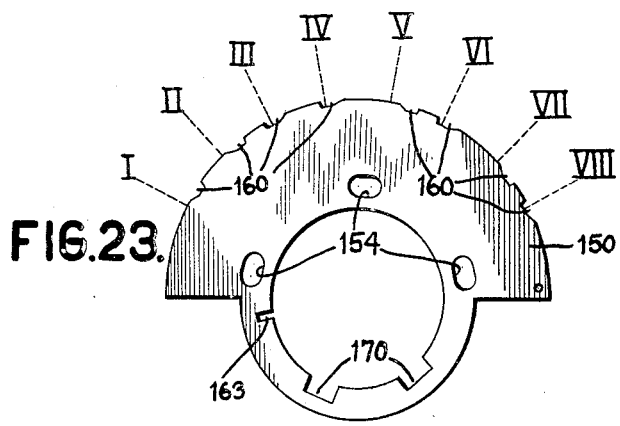
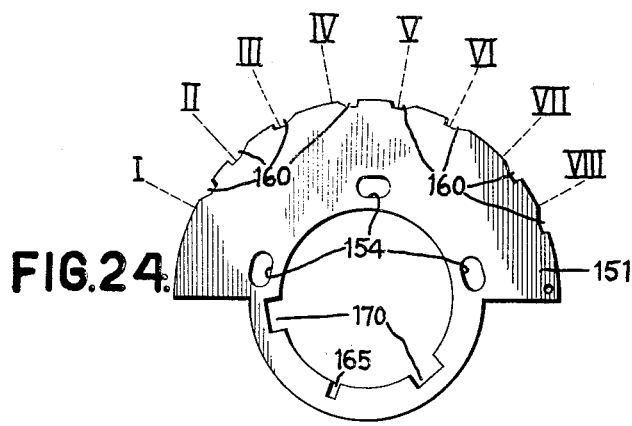
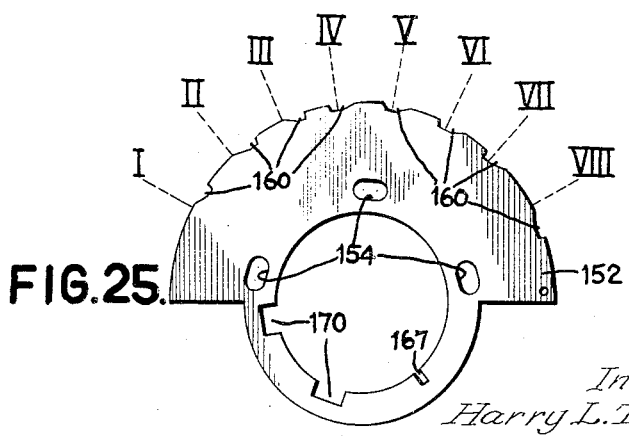
Inventor
Harry L. Tanner, dec'd,
by The National City Bank of
New York, Executor.
By Attorneys
Cooper, Kerr & Dunham

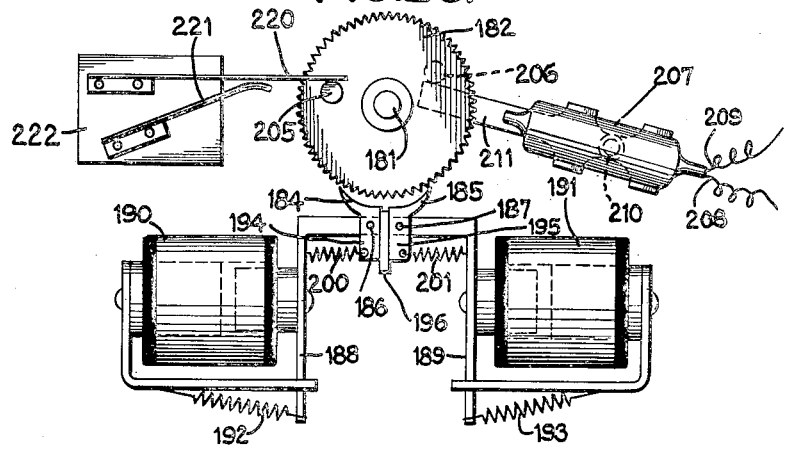
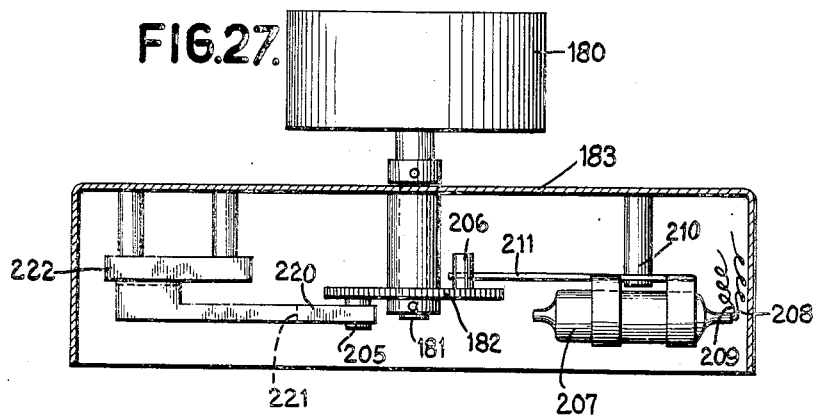
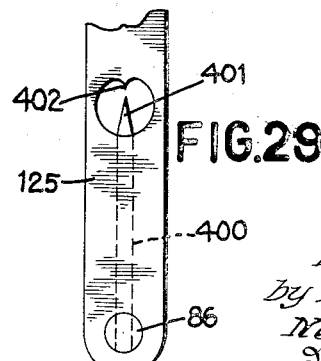

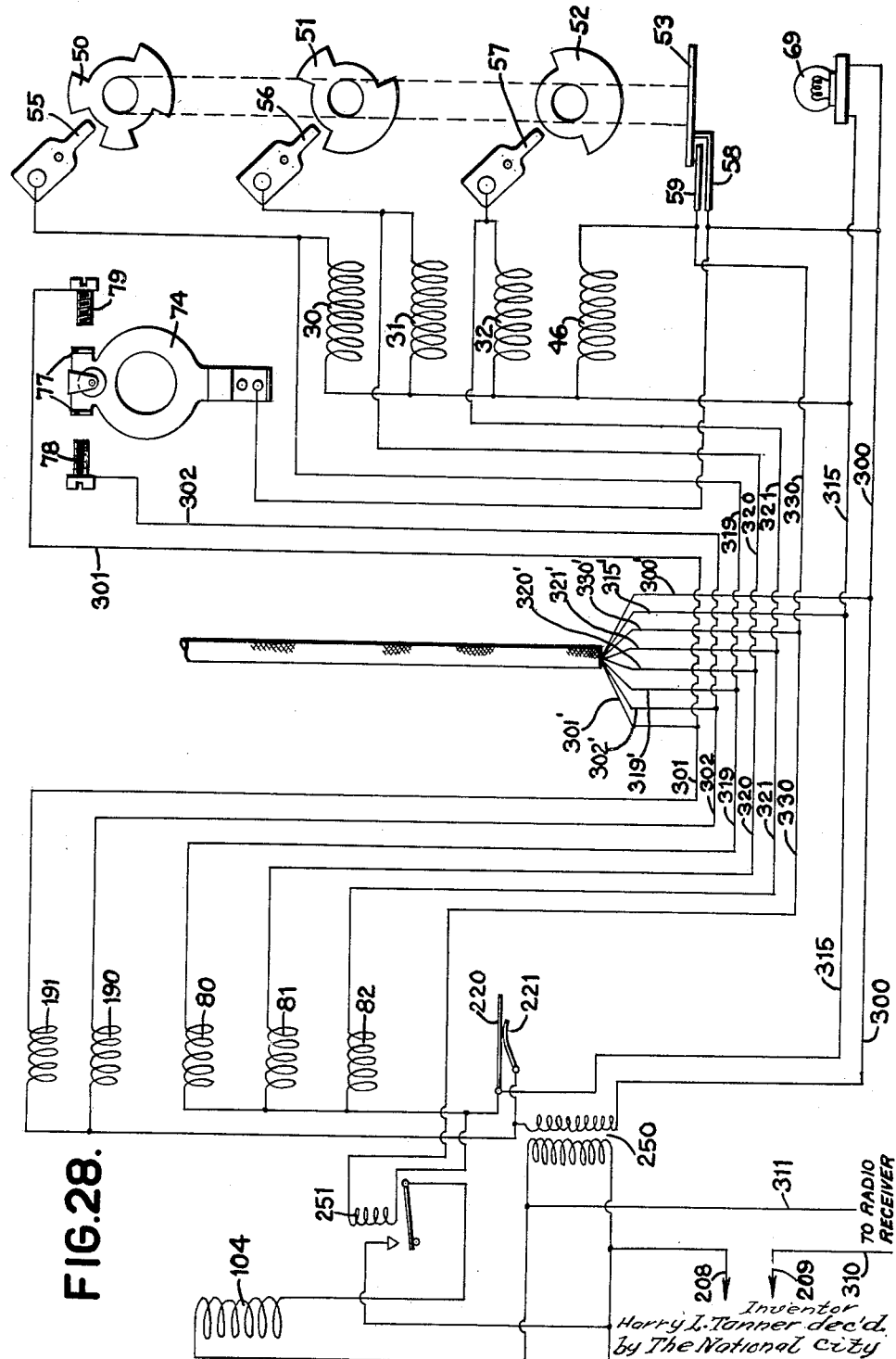

Patented June 26, 1934

1,964,231

UNITED STATES PATENT OFFICE

1,964,231

CONTROL SYSTEM AND APPARATUS

Harry L. Tanner, deceased, late of Brooklyn, N. Y., by The National City Bank of New York, executor, Brooklyn, N. Y., assignor, by mesne assignments, to Wallace & Tiernan Products, Inc., Belleville, N. J., a corporation of New Jersey Application November 28, 1930, Serial No. 498,535

9 Claims. (Cl. 250—20)

This invention relates to systems for controlling the position of an object, adapted to be set to various positions, from a station near the object and/or one or more stations remote from the object.

Among other objects the invention has for its purposes to provide a system of the class mentioned which is reliable in operation; comparatively inexpensive to construct, install, and maintain, in view of the functions performed and the results attained; which may be readily set and operated by relatively inexperienced persons; and which is safe from the standpoint of fire hazard or likelihood of personal injury. Other objects and advantages will appear as the invention is hereafter disclosed.

The system is admirably adapted to be employed in combination with a radio receiving set, such as the ordinary broadcast listener employs in his home, and the particular physical embodiment illustrated and hereafter described was designed for that purpose; it being understood, of course, that various features of the invention may be readily applied to other uses with only such changes as would be within the skill of the artisan and within the scope of one or more of the appended claims.

In operating the ordinary modern broadcast radio receiver there are in addition to the on and off switch that energizes and deenergizes the set, two main controls: (1) a tuning control, and (2) a volume control. The tuning control is commonly exercised by manual operation of a knob, lever or the like, that operates variable condensers, or variable inductances, or both, comprised in the tuning circuits of the set, so that the signals or programs of different desired transmitting stations may be selected at will. The volume control is commonly exercised by manual operation of a knob, lever, or the like, that controls a resistance, rheostat, potentiometer, or like instrumentality, that, in turn, controls the output of the receiver by controlling the signal energy supplied from the collector to the receiver, or by controlling the amplification as by change of the cathode bias of the tubes, or the heater current, or, in case of screen grid tubes, the screen grid voltage, or otherwise. The tuning movement is usually accompanied by movement of a calibrated dial, drum, or other indicator, which reads against a reference line, giving an indication of some arbitrary number and/or kilocycles. Many users of such sets find it difficult to read such indications and therefore find it difficult to select the stations they desire. Furthermore, if the tuning is slightly off, the signal or program will be heard but the quality will be poor. Also, to effect the tuning and volume control of such ordinary sets, the operator must go to the set.

According to this invention, as will presently be seen, the tuning and volume control may be readily but definitely and correctly effected either at the receiver or at any one of a number of places or control stations more or less remote from the receiving set proper.

As the invention is hereinafter disclosed it will also appear that the particular system illustrated embodies certain features of invention covered by claims of United States Letters Patent Nos. 1,320,807 and 1,350,345, granted respectively on November 4, 1919 and August 24, 1920. Familiarity with the disclosure of the two cited patents will facilitate understanding of the construction and operation of the present system.

Referring to the drawings, which illustrate what is now considered a preferred form of the invention:

Figure 1 is a front elevation of one of the instruments at a control station more or less remote from the receiving set;

Fig. 2 is a side elevation of the instrument shown in Fig. 1;

Fig. 3 is a sectional elevation taken substantially on the line 3—3 of Fig. 1;

Fig. 4 is a sectional elevation taken substantially on the line 4—4 of Fig. 3;

Figs. 5, 6 and 7, are detail views of shutter elements employed in the instrument shown in Figs. 1 to 4;

Figs. 8, 9 and 10, are detail views of contact elements employed in the instrument shown in Figs. 1 to 4;

Fig. 11 is a detail section illustrating one of the journals of a control shaft employed in the instrument shown in preceding figures;

Fig. 12 is a detail view of an index arm employed in the instrument shown in Figs. 1 to 4;

Fig. 13 is a detail side elevation (with the coil in section) of one of the electromagnets employed in the instrument shown in Figs. 1 to 4.

Fig. 13a is an end elevation, with the coil omitted, of the electromagnet shown in Fig. 13; Fig. 13a being taken looking in the direction of the arrow a.

Fig. 13b is an end elevation, with the coil omitted, of the electromagnet shown in Fig. 13; Fig. 13b being taken looking in the direction of the arrow b.

Fig. 13c is an inverted plan view (looking at

Fig. 13 in the direction of the arrow c) of the electromagnet shown in Fig. 13 but with the wire 430 and the coil omitted.

Fig. 14 is a sectional side elevation of a part of the mechanism located adjacent the radio receiver and adapted to tune the receiver.

Fig. 15 is a rear elevation of the instrument shown in Fig. 14, with the back of the casing removed.

Fig. 16 is a detail view showing mechanism for operating the tuning shaft.

Fig. 17 is a detail development showing certain of the settable control elements of the instrument shown in Fig. 14.

Fig. 18 is a detail sectional elevation of one of the eight manually settable members of the instrument shown in Fig. 14.

Fig. 19 is a detail end elevation of structure shown in Fig. 18.

Fig. 20 is a detail view of a clip also shown in Fig. 18, and showing the clip before the flanges are bent over.

Fig. 21 is an end elevation of the clip 122 shown in Fig. 20.

Fig. 22 is a detail side elevation of an adjusting mechanism for angularly setting blocks containing selector pins of which one is shown in Figs. 18 and 19.

Figs. 23, 24 and 25, are detail views of three discs employed in the instrument shown in Fig. 14.

Figs. 26 and 27 are, respectively, a front elevation, and a plan view (with the casing in section), of mechanism for operating "on" and "off" switches and the volume control of the radio receiver.

Fig. 28 is a wiring diagram of the system.

Fig. 29 is a detail elevation of devices that may be employed to facilitate manual adjustments.

Referring to Figs. 1 to 4, the instrument there shown may conveniently be referred to generally by the numeral 10 which is applied to the casing that encloses the various parts. This casing 10 is preferably constructed of metal, opaque throughout except as hereafter indicated, and provided with perforated lugs or ears 11 by means of which the instrument may conveniently be attached to a wall or other suitable support.

This instrument has journaled therein for rotation and limited reciprocation, a shaft 12 preferably constructed of insulating material. The rear end of the shaft 12 is journaled in a short hollow cylinder or cup 13 and the front end of the shaft is journaled in a bushing 14 riveted to a strap or bracket 15 (see also Fig. 11) secured to the inside of the back of the casing 10. A helical or coiled spring 16 provided in the cup 13 between the bottom of the cup and the rear end of the shaft 12 serves to bias or urge the latter forwardly, this forward movement of the shaft being limited by the engagement of a stop pin 17, secured to and extending from the shaft 12, with the rear end of the bushing 14. The shaft 12 is provided with a knob 18 by which it may be manually rotated and pushed or pressed rearwardly, i. e. inwardly, for a purpose presently appearing. In order to insure that the shaft shall not be pressed in unless it is in one or another of a number of predetermined correct angular positions, the shaft is provided with a guide pin 19 extending therethrough and adapted to seat in one or another pair of diametrically opposed notches 20 provided in the forward or outer end of the cup 13. The number and angular spacing of these notches 20 is in accordance with the number of desired angular positions of the shaft 12. Suffice it at this point to say that by virtue of the pin 19 and notches 20, the shaft 12 cannot be pressed inwardly unless it is in any one of eight predetermined desired angular positions.

The shaft 12 has keyed thereto, to rotate therewith, a pointer or index arm 21. Preferably this arm 21 is slidably keyed to the shaft 12 so that when the latter slides in and out the arm 21 does not slide with it, being constrained against such movement between the bushing 14 and the front of the casing 10. The arm 21 is provided with an index portion 22 (see also Fig. 12) and an opening 23 provided for a purpose presently appearing.

Surrounding the bushing 14 and between the forward flange of the bushing and the strap 15 (see particularly Fig. 11) are a plurality of discs, four in the present case, of metal or other opaque material. The foremost or outer one (24) of these discs is stationary and is provided with a series of angularly spaced holes or windows which register or align with translucent windows 26 provided in the face of the casing 10. The other three discs 27, 28 and 29, are rotatable or oscillatable about the bushing 14 and are constructed as shown in Figs. 5, 6 and 7, each being made of metal or other opaque material with holes or windows adapted at one time or another to register with the windows in the stationary disc 24 and with the windows 26 above described.

Each of the discs 27, 28, 29 is adapted to be operated or moved to one or the other of two angular positions dependent upon whether its corresponding one of three operating electromagnets is energized or deenergized. Each of these three electromagnets 30, 31, 32, is secured to the casing 10 and has a pivoted armature 33, 34, 35 adapted to be attracted toward its solenoid when the latter is energized and to be moved in the opposite direction by the spring 425 of the electromagnet when its solenoid is deenergized. These three electromagnets are substantially identical and a similar one of them is shown somewhat in detail in Fig. 13, and its construction described in greater detail hereafter. Each of the discs 27, 28, 29 is provided with a notch or aperture 37, 38, 39 into or through which a corresponding one of the armatures 33, 34, 35 extends to operate that disc in one direction or the other depending upon whether the corresponding electromagnet is energized or deenergized. The discs 27, 28, 29, are provided also with clearance notches or apertures 40 so as to accommodate the movement of the armatures but to prevent each disc from being operated by any but its own armature.

At this point, lest confusion arise, I wish to explain that two of the discs, i. e. the discs 27 and 28, move in a clockwise direction upon energization of their corresponding electromagnets 30, 31, (see Fig. 4), while the disc 29 moves in a counter-clockwise direction upon energization of its electromagnet 32. This enables the electromagnets and other parts to be conveniently grouped in the casing 10.

Having in mind that each of the three discs 27, 28, 29 will occupy one or the other of two angular positions, depending upon whether its corresponding electromagnet 30, 31, 32 is energized or deenergized, it will be apparent that the three discs may be caused to occupy any selected one of eight relative positions according to whether the electromagnets are energized or deenergized in various combinations. Thus there are the following eight different combinational conditions:

| I    | (30) | (31) | (32) |
|------|------|------|------|
| II   | (30) | 31   | (32) |
| III  | 30   | 31   | (32) |
| IV   | 30   | (31) | 32   |
| V    | (30) | 31   | 32   |
| VI   | 30   | 31   | 32   |
| VII  | (30) | (31) | 32   |
| VIII | 30   | (31) | (32) | in which underscoring indicates deenergization and parentheses indicate energization of the electromagnet indicated by the particular reference numeral.

Upon inspection of Figs. 5, 6 and 7, it will be appreciated that in each of the eight relative positions of the discs 27, 28, 29, there will be a corresponding combination of three of the windows 42 of the discs 27, 28, 29, in registration with each other and with one of the windows in the stationary disc 24 and one of the windows 26 in the front panel of the casing 10. Thus, according to the combinational energization of the electromagnets 30, 31, 32, there will be illuminated one or another (but only one at a time) of the eight windows 26 of the casing front, by light from the lamp, hereafter described, within the casing 10.

The principle of operation of the discs 27, 28 29 will be readily understood in view of the foregoing description and especially when read in the light of the disclosure of Patent No. 1,320,807, above cited.

The three discs 27, 28, 29, are, as stated, each movable to one of two positions and only two positions. They are limited to such movement by the respective armatures which operate them. To insure that the discs shall be very accurately positioned they may be provided with slots 48 adapted to engage, at their opposite ends, stationary stop pins 49 which are secured to the bracket or strap 15 and extend through the slots.

Each disc 27, 28, 29 is locked in one or the other of its two positions by means of the pivoted armature 43 of a lock electromagnet 46 (see Fig. 3) mounted within the instrument casing 10 on a bracket 44 secured to the rear wall of the casing. This armature 43 is biased upwardly by its spring 45 so as to engage one or the other of the notches or apertures 47 of all of the discs 27, 28, 29, there being a pair of such notches in each disc. When the electromagnet 46 is energized the armature is attracted and disengaged from the discs 27, 28, 29, so that they may then be operated by their corresponding armatures 33, 34, 35. When the electromagnet 46 is deenergized its armature 43 will engage the locking apertures 47 and hold the discs 27, 28, 29, in the combinational relative arrangement to which they have been operated.

There are also secured on and to the shaft 12 a plurality of electrically conductive contact discs or segments 50, 51, 52, 53, electrically connected to each other as by being mounted on a common conducting sleeve or hub. The disc 53 is continuous throughout its periphery but the discs 50, 51, and 52, are cut away as shown in Figs. 8, 9 and 10. Each of the segments 50, 51, 52, is adapted to make electrical contact with a corresponding one of three contacts 55, 56, 57, when the shaft 12 is pushed in and provided, of course, that a conducting portion and not a cut-away portion of the particular segment is in line with its contact at the time of depression of the shaft 12. Additional contacts 58, 59, are provided; both of which are adapted to be engaged by and make electrical contact with the disc 53 whenever the shaft 12 is depressed, i. e. pushed in. The contacts 55, 56, 57, 58, 59, are mounted on a common stationary insulating post 60 secured to the rear of the casing 10, and each of these five contacts is insulated from the others except when the shaft 12 is pushed into one or another of its eight various positions.

The electrical wiring connections will be more fully described hereafter. Suffice it at present to say that the contact 58 is a common contact that engages the disc 53 at all times and thus energizes all of the segments 50, 51, 52. Any or all of the contacts or brushes 55, 56, 57, that happen to be aligned with conducting (as distinguished from cut-away) portions of their respective segments 50, 51, 52, when the shaft 12 is pushed in, will also be energized. Each of the contacts 55, 56, 57, is electrically connected with a corresponding one of the windings of the electromagnets 30, 31, 32, respectively; and the contact 59 is electrically connected with the winding of the electromagnet 46. When the shaft 12 is pushed into any one of its eight positions (as determined by the pin 19 and slots 20), any of the segments 50, 51, 52, that has a conducting portion (as distinguished from a cut-away portion) aligned with its corresponding contact or brush 55, 56, 57, at that particular time, will engage its brush 55, 56, 57, before the brush 59 is engaged by the disc 53. When the shaft 12 is released and moves outwardly (forwardly), the disc 53 leaves the contact 59 before the segments 50, 51, 52, disengage any of their respective contacts 55, 56, 57, with which they have been engaged. The contacts or brushes 55, 56, 57, 58, 59 are sufficiently resilient to permit the required axial movements of the shaft 12 and to effect the change of circuit connections described above.

Radially in line with the eight equiangularly spaced windows 26 in the face of the casing are eight fields 65 adapted to be illuminated by the lamp within the casing 10 and which are adapted to have inscribed thereon the call letters of various broadcasting stations. Between the windows 26 and the fields 65 there is provided an annular translucent window 66 upon which the shadow of the tip or index 22 of the arm 21 is adapted to be thrown. The windows 26, the fields 65 and the annular window 66, may conveniently be provided upon an otherwise opaque dial or disc of celluloid 67 mounted in a suitable circular opening in the front of the casing 10; the annular window portion 66, the windows 26, and the fields 65 being translucent, and the latter (65) being roughened so as to be capable of having inscribed or printed thereon in pencil or ink, the call letters of the chosen broadcasting stations.

The casing 10 is provided with a socket 68 adapted to receive an electric lamp or bulb 69 extending into the casing to illuminate the interior thereof; the lamp and its socket being readily insertible into and removable from the casing. Preferably the interior of the casing 10 is painted or enameled in white so that the light from the lamp 69 will shine effectively through any registering set of windows 42 of the discs or shutters 27, 28, 29, through a corresponding one of the windows in the stationary disc 24, through the opening 23 in the index arm 21 (if the arm 21 happens to be in a position which would shut off the light in the absence of the hole 23), and thence through a corresponding one of the translucent windows 26 to illuminate the latter. The light from the lamp 69 will also illuminate the fields 65 and also cause the index or tip 22 of the arm 21 to cast a shadow upon the annular window 66, which shadow will correspond in position with the instantaneous angular position of the arm 21.

There is also provided within the casing 10 a circuit controller for governing the "volume" of the radio set and for turning the latter on and off, and which I shall now proceed to describe.

A shaft 71, of insulating material, is suitably journaled in the casing 10 and provided with an operating knob 72 on its protruding end whereby the shaft may be manually rotated in either direction. The shaft 71 has secured thereto a toothed wheel 73 adapted to engage and operate a roller 75 carried by and journaled on a spring 74 which is secured to an insulating base 76 on the back of the casing 10. The spring 74 is provided with a suitable clearance opening around the shaft 71 so as to permit one or the other of the contact portions 77 to engage one or the other of stationary contacts 78, 79, mounted upon the insulating base 76.

When the shaft 71 is rotated in a clockwise direction (Fig. 4) the spring 74 will be moved to the right to cause contact 77 to engage the contact 79. Continued rotation of the shaft 71 in a clockwise direction will cause a tooth of the wheel 73 to pass under the roller 75 and the spring 74 will snap to the left into an adjacent notch in the wheel 73 and thereby break the contact between 77 and 79. Continued clockwise rotation of the wheel 73 will cause the spring 74 again to move to the right to establish the contact 77—79, and so on. In this manner, by continued clockwise rotation of the shaft 71, the contact 77—79 will be made intermittently and the number of "makes" and "breaks" will depend upon the extent of rotation of the shaft 71. Similarly continued rotation of the shaft 71 in a counter-clockwise direction will intermittently make and break contact at 77—78. Cessation of rotation of the shaft 71 permits the spring 74 to return to its normal position (Fig. 4) in which neither contact 77 is in engagement with contacts 78, 79.

The instrumentalities at the radio receiver comprise the following (see Figs. 14 and 15).

A casing 85 has journaled therein a shaft 86 which is coupled to the shaft 87 of the tuning unit (such as the variable tuning condenser gang) of the radio receiver. The journal for the shaft 86 consists of a sleeve 88 secured adjacent one end to the spider plate 89 and adjacent its other end to the front of the casing 85 by means of a bracket 90. The spider plate 89 is secured to the drum of the casing 85.

The shaft 86 may be set manually, by means of a knob 91 secured thereto, so as to tune the radio receiver in the usual way or the tuning may be effected, under the control of the instrument 10, by means of the devices and connections now to be described.

An arm 92 carrying a pin 93 (see Figs. 14 and 16) has its hub 94 secured to the shaft 86. Interposed between the shaft 86 and the journal sleeve 88 there are two sleeves 95, 96, to which pulleys 97, 98, respectively, are secured and also, respectively, arms 99, 100. A cable or flexible wire 101 passes around a pulley 102 and is secured at its opposite ends to the pulleys 97, 98. The pulley 102 is rotatably mounted on the core or plunger 103 of a solenoid 104. Assuming that there is a stationary pin 105 in the path of movement of the arms 99, 100, it will be seen that when the solenoid 104 is energized it will attract its plunger 103, the pulley 102 will be pulled down (Fig. 16), the pulley 98 and arm 100 will be moved clockwise and the pulley 97 and arm 100 moved counter-clockwise until the arms engage the stationary pin 105. In this movement of the arms 99, 100, scissors-fashion, towards the pin 105, one or the other of the arms 99, 100 will have engaged the pin 93 of the arm 92 to move the latter to the position of radial alignment with the pin 105 shown in Fig. 16. Energization of the solenoid 104 thus causes the shaft 86 and the connected shaft 87 of the tuning unit of the radio receiver to be operated to an angular position determined by the pin 105. When the solenoid 104 is then deenergized, the arms 99, 100 are moved away from the pins 93, 105, by the action of a coiled spring 1060 mounted within the pulleys 97, 98, and having one end connected to the pulley 97 and its other end connected to the pulley 98. The arm 92 and connected parts stay, by virtue of friction, in any position of adjustment until the solenoid 104 is again energized.

There are eight pins 105 which are each angularly settable at the receiver, about the axis of the shaft 86 and any selected one of which may, under the control of instrument 10, be moved into the path of movement of the arms 99, 100, as will presently be described in greater detail. Thus by manual adjustment of parts at the radio receiver, eight various broadcasting transmitting stations may be chosen, and, under the control of the instrument 10, any one of the eight chosen stations may be tuned in at will from an adjacent or more or less remote point.

Each of the eight pins 105 is slidable (in a direction parallel to the shaft 86) in a corresponding one of eight blocks 106 into and out of the path of movement of the arms 99, 100. These rectilinear movements of the pins 105 are selectively controlled by instrumentalities hereinafter described.

The eight blocks 106 and their pins 105 are angularly settable about the axis of the shaft 86. Each of the eight blocks 106 is secured to a corresponding one of eight arcuate guide strips 110 (see particularly Fig. 17) each having substantially the same radius of curvature as the cylindrical portion of the casing 85 and whose outer surfaces slidably engage the inside of the cylindrical portion of the casing 85. A strip 111, similar in shape to that of the sliding guide strips 110, but longer, is riveted to the inner side of the cylindrical part of the casing 85 so as to confine the strips 110 between the said strip 111 and the front of the casing 85 but with sufficient clearance so as to permit the angular sliding movement of the strips 110. Each of the blocks 106 is provided with a screw 115 which extends through an annular slot 118 provided in the front of the casing 85 and which is provided with a shoulder 116 and a polygonal shank 117. Interposed between the shoulder 116 of each screw 115 and the front of the casing 85 (see Fig. 18) there is a clip 120, through which the screw passes, having flanges 121 (see Fig. 20) which are bent inwardly (see Fig. 21) so as to extend into and through the slot 118 and grip the opposite sides of its block 106. Each of these eight clips 120 is also provided with a tab portion 122 for a purpose later appearing.

By virtue of the structure described, the eight pins 105 may be angularly adjusted in the slot 118 of the casing 85 by shifting the shanks 117 of the respective screws 115. To effect the angular setting of the pins 105 and their retention in the set positions the following mechanism is provided.

A spring arm 125 (see Figs. 14 and 22) is mounted at one end upon, and rotatable about, the shaft 86. The other end of the arm 125 has journaled therein a knob or key 126 having a socket which is polygonal to conform to the shanks 117 of the screws 115 and to receive any of the eight similar shanks. To adjust any of the screws 115 it is necessary only to pull the knob 126 away from the casing, swing the arm 125 until the socket 127 is opposite the shank of that screw, permit the resiliency of the arm 125 to move the knob 126 into engagement with the shank 117, if necessary rotate the knob 126 about its axis until the socket 127 receives the shank, rotate the knob 126 to back off the screw 115, move the knob 126 (and thereby the shank 117) to desired angular position of adjustment in the slot 118, and finally rotate the knob 126 so as to tighten the screw 115 to clamp the corresponding block 106 in its set position.

Eight similar sets of mechanism are provided for controlling the rectilinear movements of the pins 105. Each of these eight sets of mechanisms comprises a corresponding one of eight angularly spaced rods 130 (see also Fig. 15) which extend in directions parallel to the axis of the shaft 86 and each of which is oscillatable about its axis, being journaled in the plate 89 and a plate 131 secured to three posts or standards 132 which, in turn, are secured to the plate 89. Each of the rods 130 is also slidable in the direction parallel to the axis of the shaft 86 and is biased or urged forwardly (i. e. towards the front of the casing 85) by a corresponding one of eight helical springs 133 each surrounding its rod 130 and abutting, at its opposite ends, against the plate 89 and a collar 134 provided on each rod 130. Each of the eight rods 130 is provided with an extension 135 (one of which is shown in Fig. 14) which extends slidably through a hole in a corresponding one of the pins 105. When permitted to do so, each of the eight springs 133 urges its rod 130, the extension 135 thereof, and the corresponding pin 105, toward the front of the casing 85. In other words, when permitted to do so, each of the eight springs 133 moves a corresponding pin 105 into the path of movement of the arms 99, 100. Such movement of each of the pins 105 is prevented, by means of intervening mechanism presently to be described, unless a corresponding one of eight arms 140 (see Figs. 14 and 15) may drop into registering notches or apertures in a series of three control disks also presently to be described. Each of the arms 140 controls its rod 130 by a corresponding set of eight similar angularly spaced sets of devices of which one set is shown in Fig. 14 and will now be described.

The arm 140 is one arm of a bell crank lever, pivoted at 141 on the plate 131, and whose other arm 142 straddles the rod 130 and engages shoulders on the rod so as to hold the rod in the position shown in Fig. 14 (against the tendency of the spring 130 to urge it forwardly, i. e. to the right as viewed in Fig. 14) unless and until the arm 140 may drop or move radially inward into a registering series of notches or apertures in the control discs now to be described.

Three control discs 150, 151, 152, shown in Figs. 14, 15, 23, 24 and 25, are provided. These discs 150, 151, 152 are each provided with three slots 154 into each of which a corresponding one of three rollers 155 extends; each roller 155 being rotatable but not slidable upon a corresponding one of the three posts or standards 132. Axial separation of the three discs 150, 151, 152, is thus prevented but oscillation of the discs about the axis of the shaft 86 is permitted; the posts 132 and consequently the axes of rotation of the rollers 155 being equidistant from the axis of rotation of the shaft 86. The angular oscillatory movement of the discs 150, 151, 152, is so limited by the engagement of the rollers with the ends of the slots 154 that each disc may occupy either of two extreme positions. The discs 150, 151, 152, are provided with external peripheral notches or apertures 160 as shown in Figs. 15, 23, 24 and 25.

Each disc 150, 151, 152, is adapted to be moved counter-clockwise from its position shown in Figs. 23, 24, 25, respectively, to its opposite limit of travel by means of electromagnets 80, 81, 82, mounted within and secured to the casing 85. The armature 162 of the electromagnet 80 extends into a notch or aperture 163 provided in the disc 150; the armature 164 of the electromagnet 81 extends into a notch 165 provided in the disc 151; and the armature 166 of the electromagnet 82 extends into a notch 167 of the disc 152. Each disc 150, 151, 152, is also provided with two clearance notches 170 to permit idle movement, with respect to that disc, of the two armatures which operate the other discs. When the coil of any of the electromagnets 80, 81, 82, is energized, the corresponding armature is attracted and moves its corresponding one of the discs 150, 151, 152, in a counter-clockwise direction. When any electromagnet 80, 81, 82, is deenergized, a corresponding one of three springs 175 moves its armature away from the electromagnet and thereby moves a corresponding one of the discs 150, 151, 152, clockwise to its other limit of angular travel.

Upon inspection of Figs. 15, 23, 24, and 25, it will be seen that when the electromagnets 80, 81, 82, are combinationally energized and deenergized there will be eight different angularly spaced positions of registration of apertures 160 in all three discs. Thus there are the following eight different combinational conditions:

| | | | |
|---|---|---|---|
| I | (80) | (81) | (82) |
| II | (80) | 81 | (82) |
| III | 80 | 81 | (82) |
| IV | 80 | (81) | 82 |
| V | (80) | 81 | 82 |
| VI | 80 | 81 | 82 |
| VII | (80) | (81) | 82 |
| VIII | 80 | (81) | (82) | in which underscoring indicates deenergization and parentheses indicate energization of the electromagnet indicated by the particular reference numeral. No arm 140 can move radially inwardly unless there are brought into radial registry with it, apertures 160 in all three discs 150, 151, 152. Also, only one arm 140 will be in the inner position at any one time. By inspecting the above table and Figs. 15, 23, 24 and 25, the selective and segmental operation of the arms 140 and consequently the pins 105 (into and out of the path of the arms 99, 100) will be understood.

For operating the volume control of the radio receiving set, a potentiometer or other suitable volume control device 180, suitably connected to the receiving circuit, has its movable element coupled to a shaft 181 to be operated thereby (see Figs. 26 and 27). The shaft 181 is journaled in the casing 183 and has secured thereto a toothed wheel 182 adapted to be operated step-by-step in one direction by a pawl 184 and in the opposite direction by a pawl 185. The pawls 184, 185, are respectively pivoted at 186, 187, to a corresponding one of two armatures 188, 189, of two electromagnets 190, 191, respectively, secured to the casing 183. Each armature 188, 189, is pulled towards its electromagnet 190, 191, when its electromagnet is energized and is pulled in the opposite direction (when its electromagnet is deenergized) by a corresponding one of two springs 192, 193. When its corresponding electromagnet 190, 191, is deenergized the arm 194, 195, of each pawl 184, 185, abuts against a stationary stop 196 so as to clear the teeth of the wheel 182. When, however, an electromagnet 190 or 191 is energized and its armature 188 or 189 thus attracted, a corresponding spring 200 or 201, secured at one end to its pawl arm 194 or 195 and at its other end to its armature 188 or 189, causes the pawl 184 or 185 to which it is connected to engage the teeth of the wheel 182.

Thus, when the electromagnet 190 is intermittently energized, the wheel 182 will be operated step-by-step in a clockwise direction and when the electromagnet 191 is intermittently energized, the wheel 182 will be operated step-by-step in a counter-clockwise direction. By virtue of the friction of parts, the wheel 182 and the potentiometer arm which it operates will remain in any set position until it is again operated by one or the other of the electromagnets 190, 191.

The wheel 182 and its operating mechanism are employed also for operating a switch for turning on and off the power supply to the radio receiving set, and for operating another switch whose function will presently appear. To these ends, there are carried by the wheel 182, two pins 205, 206, of insulating material, projecting from opposite faces of the wheel. The switch 207, which is the "on" and "off" switch for the power supply of the receiving set, is a mercury switch, i. e. having a sealed glass tube containing a globule of mercury adapted to bridge two contacts 208, 209, sealed into the glass tube, or to disengage these contacts, when the tube is tilted in one direction or the other. The switch 207 is pivotally mounted at 210 and has an arm 211 extending into the path of movement of the pin 206. Continued rotation of the wheel 182 in the direction to reduce the volume of the output of the radio receiver (i. e. in a clockwise direction) causes the pin 206 to engage the arm 211 of the switch 207 so as to tilt the latter about its axis 210 and disengage the mercury globule from the contacts 208, 209. When the wheel 182 is rotated in the opposite direction (i. e. counter-clockwise) the pin 206 moves away from the arm 211 and permits the switch 207 to move by gravity bias to the position shown in Fig. 26 in which the contacts 208, 209, are again bridged by the mercury globule.

The pin 205 is adapted to engage and operate the spring contact 220 of the switch 220—221 and to disengage the contact 220 from the contact 221. The contacts 220, 221, are secured to an insulating base 222 carried by the back of the housing 183. Continued rotation of the wheel 182 in the direction to reduce the volume of the radio receiver, causes the pin 205 to open the switch 220—221. Rotation of the wheel 182 in the opposite direction permits the contact 220, by virtue of its resiliency, to engage the contact 221.

It will be noted that by locating the pins 205, 206 on opposite faces of the wheel 182, the wheel 182 may make almost a complete revolution in its operation of the volume control.

A wiring diagram of the system is shown in Fig. 28. The primary winding of the transformer 250 is connected across a source of alternating current at say 110 volts. The ratio of transformation of this transformer is such that there will be about 10 volts across the secondary. This transformer 250 may be an ordinary so-called "bell-ringing" transformer or of that type. Its energy consumption is low, especially with no load on the secondary, so that its primary may be connected to the supply line at all times at low cost. One side of the transformer secondary is connected through a line wire 300 to the contacts 77, 77, (through the spring 74). The contact 79 is connected through a line wire 301 to the coil of the electromagnet 191 and the contact 78 is connected through a line wire 302 to the coil of the electromagnet 190; the other ends of the coils 190 and 191 being connected to each other and to the end of the secondary of the transformer 250 opposite that end thereof connected to the line wire 300.

Assuming that the switches 220—221 and 207 (contacts 208, 209) are open and it is desired to place the set into operation, the knob 72 (see also Figs. 1 to 4) is manually turned clockwise. This movement of the knob 72 causes a contact 77 intermittently to engage the contact 79 and thus to make and break the circuit, above traced, through the electromagnet coil 191. The resultant energization and deenergization of the coil 191 (see also Fig. 26) causes the wheel to be moved counter-clockwise, step-by-step, and to move the pins 205, 206, away from the arm 220 of the switch 220—221 and the arm 211 of the switch 207, respectively. The contacts 220—221 thereupon close and the contacts 208—209 of the switch 207 close, as previously described. Closure of the contacts 208—209 causes power to be supplied from the A. C. supply line through the wires 310, 311, to the radio receiver. Assuming that the latter has been previously tuned to a selected one of eight chosen stations, it will now begin to reproduce the program transmitted from that station. Closure of the switch 220—221 causes the lamp 69 to be energized through the following circuit: secondary of transformer 250, line wire 300, lamp 69, line wire 315, switch 220—221, back to the transformer secondary. The lamp 69 therefore lights and causes to be illuminated one of the windows 26 (see Fig. 1), corresponding to and indicating the call letters of the transmitting station to which the radio receiver has been tuned.

If it is desired to increase the volume at any time, the knob 72 is turned clockwise thereby causing the electromagnet 191 to turn the wheel 182 counter-clockwise to increase the volume by operating the potentiometer 180 (see Fig. 27) in the volume-increasing direction. If it is desired to decrease the volume, the knob 72 is turned counter-clockwise, causing the contacts 77—78 to make and break the circuit of the electromagnet 190 and thus causing the wheel 182 to move in a clockwise direction to reduce the volume.

If it is desired, at any time, to turn the set off, the knob 72 is sufficiently rotated counter-clockwise to make and break the circuit of the electromagnet 190 to cause the pins 205, 206, to open the switches 208—209, and 220—221.

The circuits of the tuning controls will now be traced and described. The circuit of the electromagnet 80 is: from the transformer secondary, line wire 300, brush 58, disc 53, segment 50 to brush 55 (when this brush 55 is in engagement with the segment 50), line wire 319, coil of electromagnet 80, switch 220—221, back to the transformer secondary. The circuit of the electromagnet 81 is: from the transformer secondary, line wire 300, brush 58, disc 53, segment 51, to brush 56 (when closed), line wire 320, coil of electromagnet 81, switch 220—221, back to the transformer secondary. The circuit of the coil of the electromagnet 82 is: from the secondary of the transformer, line wire 300, brush 58, disc 53, segment 52 to brush 57 (when closed), line wire 321, coil 82, switch 220—221, back to the secondary of the transformer.

It will be noted that each of the coils 30, 31, 32, is in parallel with a corresponding one of the coils 80, 81, 83, in the above traced circuits so that: with the switch 220—221 closed, when the brush 55 engages the segment 50, the coils 30 and 80 will be energized; when the brush 56 engages the segment 51, the coils 31 and 81 will be energized; and when the brush 57 engages the segment 52, the coils 82 and 32 will be energized.

The circuit of the coil of the lock electromagnet 46 is: from the secondary of the transformer, line wire 300, brush 58, disc 53 to brush 59 (when closed), coil 46, line wire 315, switch 220—221, back to the transformer secondary. When the switch 220—221 is closed, closure of the disc 53 on the brush 59 energizes also the coil of a relay 251 (located at the radio receiving set) through the following circuit: from the secondary of the transformer, line wire 300, brush 53, disc 53, brush 59, line wire 330, coil 251, switch 220—221, back to the transformer.

The relay 251, when energized, closes the circuit of the solenoid 104 across the supply line. Preferably this relay 251 is of the sealed mercury contact type, similar to the switch 207 (Fig. 26) except that it is operated by the coil of the relay instead of by a pin, etc. as shown in Fig. 26.

The tuning operation and the indicator operation will now be briefly summarized.

The tuning knob 18 (see also Figs. 1 to 4) is turned until the shadow of its pointer 22 (see also Fig. 12) on the translucent annular field 66 is opposite the one of the eight fields 65 that bears the call letters of the desired station, say station WEAF, which is on the third position 3 (Fig. 1). This angular adjustment of the shaft 12 places the sectors 50, 51, 52, in the third angular position (see Figs. 8, 9, 10). The shaft 12 is now pressed inwardly by pushing in on the knob 18. Such inward movement of the knob 18 first causes the sectors 50, 51, 52, to engage any of their respective brushes 55, 56, 57, that are adapted to be engaged in the then angular position of adjustment of the shaft 12; under the assumption made—the brush 57 will be energized and the brushes 55 and 56 will not be energized (see the third position in Figs. 8, 9 and 10). This energization of the brush 57 causes the coils 32 and 82 to become energized; the coils 30, 31, and 80, 81, being at this time deenergized. The energization of the coil 82 (with coils 80, 81, deenergized) causes apertures 160 of the discs 150, 151, 152, to align on the third angular position (see Figs. 14, 15, 23, 24, 25) and the arm 140 adjacent that third position will drop into that series of registering apertures 160 under the action of its spring 133; all of the other seven arms 140 being held out by one or another of the three discs. The spring 130 corresponding to the particular (third) arm 140 also slides the corresponding rod 130 (see Fig. 14) and its extension 99 and its corresponding pin 105, to the right or forwardly into the path of movement of the arms 99, 100; all of the other seven pins 105 being at this time held rearwardly out of the path of the arms 99, 100, by virtue of the fact, as stated, that their corresponding arms 140 are held out. The pin 105 that has thus been moved into the path of the arms 99, 100, will have been previously angularly adjusted by the manual setting of the corresponding block 106 to an angular position corresponding to the condenser setting for station WEAF.

Further depression of the shaft 12 by the knob 18 causes the brush 59 to be engaged by the disc 53 causing energization of the relay 251 and the lock electromagnet 46. Energization of the relay causes closure of the energizing circuit of the solenoid 104 and the latter closes the scissor arms 99, 100 (see Figs. 14, 15, and 16) to cause the pin 93 radially to align with the selected pin 105 as above described. The shaft 86 and the connected tuning shaft 87 are thus set to tune the radio receiving set to station WEAF.

As described above, when the shaft 12 was depressed and caused energization of coil 82, it also caused energization of the coil 32 (the coils 30, 31, being at this time deenergized). When the contact 59 was, by further depression of the shaft 12, engaged by the disc 53 to energize the relay 251, it also caused the coil 46 to be energized. Energization of the coil 46 caused the armature 43 (see Figs. 3, 5, 6 and 7) to be attracted permitting the discs 27, 28, 29 to assume their combinational position corresponding to the third position (i. e. energization of coil 32 and deenergization of the coils 30, 31) and the one of the windows 26 which is opposite the WEAF field 65, became illuminated.

Station WEAF has now been tuned in and the radio receiver is reproducing the program of that transmitting station. The tuning knob 18 is now released and the spring 16 (Fig. 3) presses the shaft 12 forwardly. Upon such forward movement of the shaft 12, the disc 53 first leaves the brush 59 and subsequently the segment 52 leaves its brush 57. When the contact between the disc 53 and the brush 59 is broken, the coil 46 is deenergized and the armature 43 locks the discs 27, 28, 29, in the position to which they have been adjusted. Also when the contact between the disc 53 and the brush 59 is broken, the relay 251 and consequently the solenoid 104, are deenergized. When the solenoid 104 is deenergized the arms 99, 100, (see Figs. 14 and 16), move away from the pin 93 and leave it in the position to which it has been set.

The above described tuning operations take place in a much shorter time than it takes to describe them. Thus, to effect the tuning to radio transmitting station WEAF, all that the operator does is to turn the knob 18 until the shadow of the pointer 22 indicates WEAF (third position Fig. 1), then push the knob 18 in, and then release it. The radio receiving set will thus have been tuned to WEAF and the illumination of the window 26 adjacent the field 65 bearing the inscription WEAF indicates that station WEAF is tuned in. The operation is similar to tune in any of the other seven chosen transmitting stations.

The operations of the knob 72 (Fig. 1) to control volume and to turn the system on and off has been described.

As many instruments 10 may be provided as are desired to control the same receiving set. The radio receiving set may, for example, be located in the living room with a control instrument 10 adjacent to it, and with another identical control instrument 10 located in the dining room. In Fig. 28 the electrical connections of one control instrument 10 are shown in detail. A duplicate control instrument 10 may be similarly connected to the same transmission lines 301, 302, 319, 320, 321, 330, 315, 300, as indicated in Fig. 28, through the lines 301', 302', 319', 320', 321', 330', 315', and 300', respectively. Each of the two or more control instruments 10 may thus be employed to turn the same set on or off, control its volume, and tune it, and each instrument will automatically indicate whether the set is on or off, and if on, to what station it is tuned.

To aid in the described manual setting of the blocks 106 to the chosen stations, the shaft 86 may be provided (see Fig. 29) with an arm 400 terminating in a pointer 401 in line with the center of the pin 93 of the arm 92 and the spring arm 125 may be provided with a pointer 402 in line with any pin 105 when the socket 127 is in operative engagement with the shank 117 corresponding with that pin 105. To adjust any block 106 so that its pin 105 will be in angular position to be moved into operative position to cause the tuning in of a chosen station: the station is manually tuned in by means of the knob 91, the knob 126 is engaged on the shank 117 which it is desired to set, the corresponding screw 115 is backed off by turning the knob 126, the arm 125 and block 106 are rotated together about the shaft 86 until the pointer 402 aligns with the pointer 401, and the knob 126 is then turned to tighten the screw 115 and clamp the corresponding block 106 in its set position. The eight tabs 122 of the eight blocks 106 have the numbers 1 to 8 stamped or printed thereon to correspond to the numbers 1 to 8 printed on the field 66, and to eight positions variously spoken of above.

The electromagnet 32 (Fig. 4) is shown in greater detail in Figs. 13, 13a, 13b and 13c; the electromagnets 30, 31 and 46 being somewhat similar in construction. This electromagnet 32 comprises a strip of iron or other magnetizable material 410 bent to the shape, generally similar to an "S", shown in side elevation in Fig. 13. The base portion 411 is comparatively wide and is provided with holes 412, which may be tapped to receive mounting screws, and with projecting ends 413, 413, notched at 414, 414. The part of the strip 410 which forms the core 415 and the pole 416 is of somewhat reduced width (see Fig. 13a). The coil portion of the electromagnet consists of alternate layers of insulating material (such as paraffined paper) and helical windings of enameled or otherwise insulated copper wire. This coil may readily be built up by wrapping a layer of strip insulation on a form of the same shape as core 415, then winding a helical layer of the insulated wire over the layer of paper, then winding another layer of paper, another layer of the wire, and so on until the desired number of turns of wire have been applied. The coil may then be removed from the form and slipped over the core 415. The armature 420, of magnetizable material, is provided with notches 421, 421, to receive the ends 413, 413 of the base 411 (see Fig. 13b). A phosphor bronze spring strip 425 is notched similarly to the armature 420 to receive the ends 413, 413, of the base 411. A copper wire 430 bent around the ends 413, 413, of the base 411, in the notches 414, 414, and outside the armature 420, completes the electromagnet. The spring 425 urges the armature away from the pole 416 when the coil of the electromagnet is deenergized but permits it to move to the dotted line position (Fig. 13) when the coil is energized. The spring 425, being interposed between the core and the armature, also prevents "sticking" of the armature. If suitable contacts are provided, as they may be by any one skilled in the art, the electromagnet may be employed as a relay.

What is claimed is:

1. In a system of the class described, in combination, a tuning-control device, a volume-control device, a plurality of members each adapted to be manually adjusted to any one of a plurality of desired positions in accordance with radio stations to be tuned in, means for manually adjusting said members to their various desired positions and for locking them in such positions, remotely controlled means for selectively rendering any desired one of said manually adjusted members operative to determine the position to which the tunning-control device shall be actuated; said remotely controlled means including a plurality of movable permutation elements, a plurality of differentially arranged notches in said permutation elements, a plurality of tumbler elements each adapted to enter a corresponding group of said notches when in registry and to cause actuation of a corresponding one said manually adjusted members to its operative position, and electromagnetic means for variously operating said permutation elements; remote control means controlling the energization of said electromagnets to select any desired one of the manually adjusted members, means for operating the tuning-control device to the position determined by the selected manually adjusted member; said last mentioned means comprising a solenoid, a pulley mounted on the plunger thereof, a cable passing around the pulley, a pair of actuating arms each operated by a corresponding end of the cable under the pull of the solenoid upon its plunger to move said tuning-control device to a position determined by the engagement of the actuating members with the selected manually adjusted member; means for automatically indicating at the remote control station the radio station which has been tuned in under the control of said remote control means; said last mentioned means including a plurality of movable members having a plurality of spaced apertures therein, the relative spacing on each member being such that a movement of a member causes an unobstructed opening through all members at a point, that a movement of another member causes a similar opening at another point, and that a movement of a pair of said members causes a similar opening at another point, and electromagnetic means for so moving said members, said last mentioned electromagnetic means being energized upon energization of said first mentioned electromagnetic means; and means under the control of the remote control station for turning on and off a radio receiver tuned by the tuning-control device, for operating the volume-control device, and for energizing and deenergizing the control system.

2. In a system of the class described, in combination, a rotatable tuning-control device, means for selectively determining the position to which the tuning-control device shall be actuated, and means for actuating the tuning-control device to the selected position; said last mentioned means comprising an electromagnet, an armature operated thereby, a cable differentially operated by the armature, and differential mechanism including a pair of actuating arms operated by the cable, one arm being operated by one end of the cable and the other arm being operated by the other end of the cable.

3. A tuning-control system comprising, in combination, a tuning-control device, an element connected to said device for operating it, means including a second element for selectively determining the position to which the tuning-control device shall be operated, and means for causing the first mentioned element to align with the second element; said last mentioned means comprising a pair of differentially operated arms adapted to engage both of said elements and solenoid-operated mechanism for differentially operating said arms.

4. In a system of the class described, in combination, a shaft for operating the tuning gang condenser of a radio receiver, a pair of arms pivotally mounted on said shaft, a third arm secured to said shaft and having a part extending into the path of pivotal movement of the first mentioned pair of arms, means for predetermining a selected position of said shaft, and a solenoid and connections controlled by said solenoid for differentially operating the first mentioned pair of arms and thereby the third arm to any one of a plurality of selected positions as predetermined by said means.

5. In a system of the class described, in combination, a shaft for operating the tuning gang condenser of a radio receiver, a pair of arms pivotally mounted on said shaft, a third arm secured to said shaft and having a part extending into the path of pivotal movement of the first mentioned pair of arms, a plurality of elements angularly spaced about the axis of said shaft and each movable into and out of the path of movement of the arms of the first mentioned pair of arms, means whereby the said elements may be angularly set to various positions corresponding to various radio stations to be received, a plurality of permutation discs mounted for movement about the axis of said shaft, a plurality of tumblers adapted to become operative one at a time depending upon the relative positions of said permutation discs, and connections between each of said first mentioned elements and a corresponding one of said tumblers for causing each tumbler when operative to cause its corresponding one of said elements to be moved into the path of movement of said first mentioned pair of arms, and means for actuating said first mentioned pair of arms in opposite directions into engagement with any of said elements which has been moved into their path and thereby causing said third arm to assume an angular position about the shaft corresponding to the angular position of the element which has been engaged by the first mentioned pair of arms.

6. In a system of the class described, in combination, a shaft for operating tuning devices, a plurality of elements angularly spaced about the axis of said shaft and selectively operable for determining the angular position to which the shaft will be actuated, a plurality of blocks adjustable about the axis of the shaft and in each of which a corresponding one of said elements is mounted, means comprising a plurality of screws each connected to a corresponding one of said blocks for releasably holding its block in adjusted position, and a wrench mounted for rotation about said shaft for engagement with any selected one of said screws and for revolution about the axis of the selected screw to screw or unscrew the latter.

7. In a system of the class described, in combination, a tuning-control device, a plurality of members each adapted to be manually adjusted to any one of a plurality of desired positions in accordance with radio stations to be tuned in, remotely controlled means for selectively rendering any desired one of said manually adjusted members operative to determine the position to which the tuning control device shall be actuated; and means for automatically operating the tuning-control device to the position determined by the selected manually adjusted member; said last mentioned means comprising a solenoid, a pulley mounted on the plunger thereof, a cable passing around the pulley, a pair of actuating arms each operated by a corresponding end of the cable under the pull of the solenoid upon its plunger to move said tuning-control device to a position determined by the engagement of the actuating arms with the selected manually adjusted member.

8. In a system of the class described, in combination, a tuning-control device, electromagnetic means for preselecting a position to which the tuning-control device is to be adjusted, electromagnetic means for adjusting the tuning-control device to the preselected position, a manually operable member, means for energizing the first mentioned electromagnetic means by movement of the manually operable member in a predetermined direction, and means for subsequently energizing the second mentioned electro-magnetic means by further movement of the manually operable member in the same predetermined direction.

9. In a system of the class described, in combination, a tuning-control device, electromagnetic means for selectively determining to which of a plurality of positions the tuning-control device shall be operated, electromagnetic means for actuating the tuning-control device to the selected position, indicating means, electromagnetic means for operating the indicating means, locking means for preventing or permitting operation of the indicating means by the third mentioned electromagnetic means, electromagnetic means for operating the locking means, and means for energizing the first mentioned and third mentioned electromagnetic means and subsequently energizing the second mentioned and fourth mentioned electromagnetic means.

THE NATIONAL CITY BANK
OF NEW YORK,
*Executor of the Estate of Harry L. Tanner, Deceased,*
By J. FRANK BIRDSELL, [L. S.]
*Trust Officer.*